G. T. MEYERS.
GLASS OR PORCELAIN FACED BRICK OR BLOCK.
APPLICATION FILED FEB. 3, 1919.
1,335,384.
Patented Mar. 30, 1920.
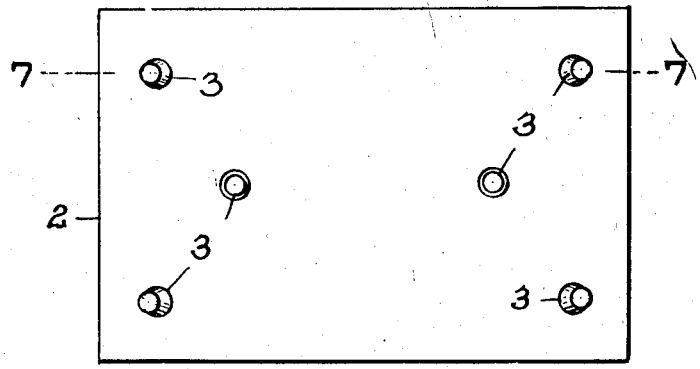
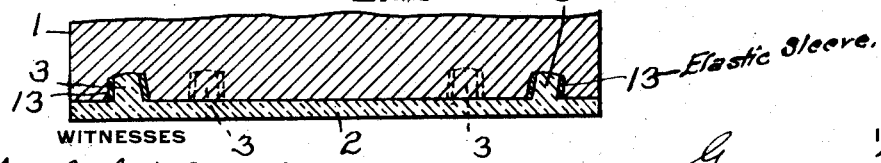

UNITED STATES PATENT OFFICE.

GEORGE T. MEYERS, OF SWISSVALE, PENNSYLVANIA.

GLASS OR PORCELAIN FACED BRICK OR BLOCK.

1,335,384.  Specification of Letters Patent.  Patented Mar. 30, 1920.

Application filed February 3, 1919. Serial No. 274,613.

*To all whom it may concern:*

Be it known that I, GEORGE T. MEYERS, a resident of Swissvale, in the county of Allegheny and State of Pennsylvania, have invented a new and useful Improvement in Glass or Porcelain Faced Bricks or Blocks, of which the following is a specification.

This invention relates to a building brick or block formed of any suitable plastic material and provided with a facing of glass, china, or porcelain, whereby the brick or block is rendered water-proof and well adapted for outside work, and is also decorative so that it can be used in places where tiling is generally used. The object of the invention is to provide a faced brick or block which can be cheaply made, in which the facing is securely attached to the brick or block and in a manner which permits it to be attached to the block either when forming the brick or block, or thereafter.

In the accompanying drawings Figure 1 is an inside face view of the facing member, and Fig. 2 is a sectional view showing the same applied to the body of the brick or blocks.

The body 1 of the brick or block may be formed of clay, cement, or any other suitable plastic or cementitious material which can be readily molded and which thereafter either sets sufficiently by ordinary drying or may be burned in the usual way of making brick. This body can be made of any desired shape or size. The facing 2 is a molded or pressed plate formed of glass, porcelain, china, or other similar vitreous material and of a size substantially equal to the face of the brick or block to which it is applied. It may have its outer face perfectly smooth or ornamented in any desired way, which may be conveniently done because it is formed by an ordinary pressing operation well known in the glass and porcelain industry.

The facing on its inner surface is provided with a plurality of prongs or studs entering openings in the body and serving to secure the same thereto. These prongs may be variously arranged and of various forms. The drawings show a number of prongs 3 which are slightly tapered but which obviously can be cylindrical, if desired, and some of which are set out of the perpendicular, that is, on a slant as shown in these views. With this construction the facing is attached to the brick or block when molding the latter, such as by placing the facing in one side of the mold, with the prongs projecting inwardly, and then pouring or molding the plastic or cementitious material into the mold against said facing. This form is particularly adapted for facing blocks formed of cement or similar material which sets sufficiently without burning.

These facings can be either of the exact dimensions of the face of the brick or block, or slightly larger both widthwise and lengthwise of the block, so that the meeting edges of the adjacent facings cover and conceal the mortar joints between the bodies of the bricks or blocks. If desired, the meeting edges of the facings may be tongued and grooved, so as to form interlocking connections between said facings.

To allow for differences in the coefficients of expansion and contraction of the body and facing, suitable yielding material is preferably interposed between the prongs of the facing and the body. The sleeves 13 of suitable elastic material surrounding the prongs will yield and thus allow for differences in expansion and contraction transversely and longitudinally of the facing and body of the brick or block. Sleeves of rubber or like composition answer the purpose.

The construction described provides a convenient way of applying a water-proof and ornamental facing to a brick or block of any size, and in a manner to very securely fasten said facing to the brick or block, and make the attachment much more permanent and with less liability of becoming loose than where ordinary tile are used for facing walls. It is therefore well adapted to outside use or other uses where the bricks or blocks are subjected to wide variations of temperature.

Obviously, various modifications in the form and size of the parts can be made.

I claim:

1. A brick or block comprising a body of plastic material and a facing of vitreous material, said facing having projections extending into openings in the body and interlocking therein, and yielding means surrounding said projections and located within said openings in the body to allow for expansion and contraction.

2. A brick or block comprising a facing having a plurality of projections thereon, a body of plastic material interlocking with said projections, and yielding means surrounding said projections to allow for unequal transverse and longitudinal expansion and contraction of said facing and said body.

In testimony whereof, I have hereunto set my hand.

GEORGE T. MEYERS.